(No Model.)
A. H. HANDLAN, Jr.
HEAD LIGHT.
No. 348,464. Patented Aug. 31, 1886.
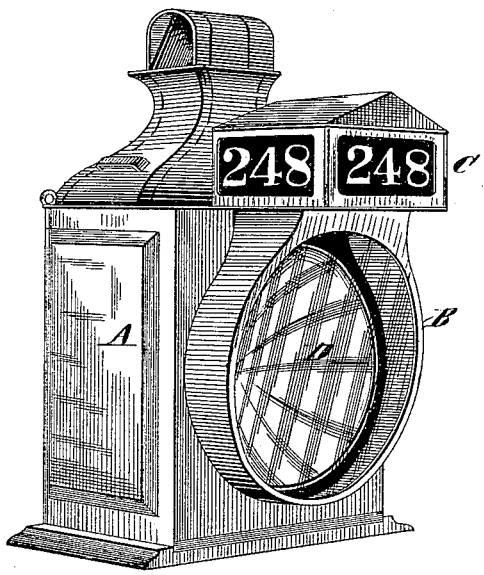
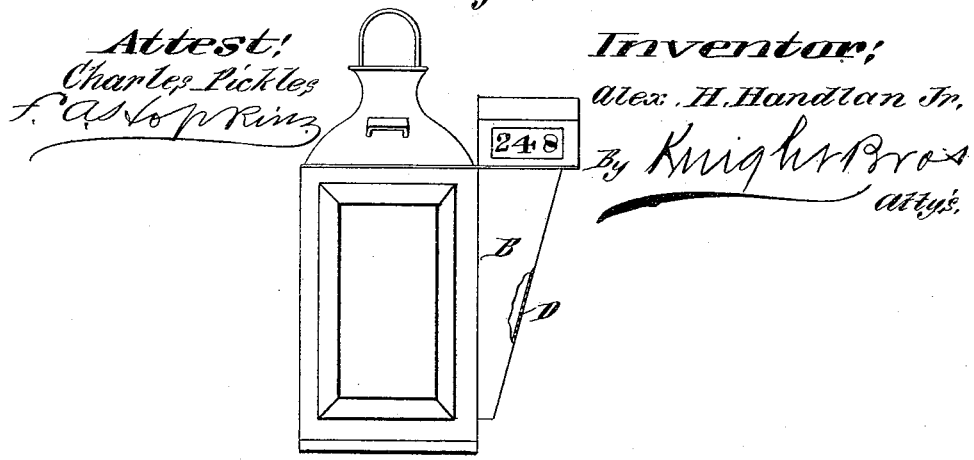

United States Patent Office.

ALEXANDER H. HANDLAN, JR., OF ST. LOUIS, MISSOURI.

HEAD-LIGHT.

SPECIFICATION forming part of Letters Patent No. 348,464, dated August 31, 1886.

Application filed January 25, 1886. Serial No. 189,695. (No model.)

*To all whom it may concern:*

Be it known that I, ALEXANDER H. HANDLAN, Jr., of the city of St. Louis, in the State of Missouri, have invented a certain new and useful Improvement in Head-Lights, of which the following is a full, clear, and exact description, reference being had to the accompanying drawings, forming part of this specification, and in which—

Figure 1 is a perspective view of a locomotive head-light embodying my invention. Fig. 2 is a side elevation.

It has been the source of considerable annoyance, particularly in western countries, to have large birds—for instance, wild ducks—fly against and break the glass of locomotive head-lights in the night when the light is lighted, which results not only in the loss of the glass and the extinguishing of the light, but also in an annoying and sometimes dangerous delay to the train. This flying of the birds against the glass is of course due to their natural instinct to fly toward a brilliant light.

Several other quite as important advantages are gained by my construction of head-light, to wit: The refracted rays of light are thrown upon the track more closely to the locomotive; the danger of breakage of the glass by hail during a hail-storm is greatly lessened, and, like the birds, when they strike the glass they will be deflected or warded off without breaking the same, and there is less liability of the lodgment of dust, cinders, and snow upon the surface of the glass and rim surrounding it.

The objects of my invention are to so construct head-lights that the glass cannot be broken in the manner stated, and to obviate the difficulties mentioned; and to this end my invention consists in features of novelty hereinafter described, and pointed out in the claims.

Referring to the drawings, A represents the body of the head-light, with the usual rim, B, and case C containing the number of the engine.

D represents the glass secured in the rim B. Heretofore it has been the practice to secure this glass in a vertical position, and hence the breakage above mentioned.

I prefer to incline the glass vertically, as shown in the drawings, but do not wish to confine myself thereto, nor do I wish to confine myself to the amount of inclination, for the glass can be inclined horizontally and the amount of inclination could be changed. By practical use this arrangement of the glass has been found to fully obviate the difficulties above stated.

I prefer to incline the outer face of the rim, as shown, as well as the glass, to prevent the snow and ice in stormy weather from clinging to the rim as much as it does where the rim is vertical on its outer face, and the inclination of the glass also prevents the sticking of the sleet upon it, as well as preventing it from being broken, as above stated.

I am aware that glass has been arranged in inclined position in street and other lamps; but I am not aware that the idea of using the inclined glass surface as I have shown for head-lights has been before suggested. The application of the idea to this new relation and function has necessitated a change in the form of the glass-holding rim which renders the whole distinct, not only from ordinary street-lamps, but from any form of head-lights with which I am acquainted.

I claim as my invention—

1. A locomotive head-light having an inclined glass, substantially as and for the purpose set forth.

2. In a locomotive head-light, in combination with a rim or glass holder projecting to unequal distances at opposite points, so as to prevent the accumulation thereon of snow, cinders, &c., a glass fixed in said rim in inclined position, substantially as set forth.

ALEXANDER H. HANDLAN, JR.

In presence of—
GEO. H. KNIGHT,
JOSEPH WAHLE.